United States Patent
Li

(10) Patent No.: US 7,310,151 B2
(45) Date of Patent: Dec. 18, 2007

(54) INTERFEROMETRIC OPTICAL APPARATUS AND METHOD USING WAVEFRONT DIVISION

(76) Inventor: Chian Chiu Li, 1847 Bristol Bay CMN, San Jose, CA (US) 95131-3802

( * ) Notice: Subject to any disclaimer, the term of this patent is extended or adjusted under 35 U.S.C. 154(b) by 147 days.

(21) Appl. No.: 11/161,892

(22) Filed: Aug. 22, 2005

(65) Prior Publication Data

US 2006/0044566 A1    Mar. 2, 2006

Related U.S. Application Data

(60) Provisional application No. 60/605,633, filed on Aug. 30, 2004.

(51) Int. Cl.
*G01B 9/02* (2006.01)
(52) U.S. Cl. .................................................. 356/479
(58) Field of Classification Search ................. 356/477, 356/479, 497; 250/227.19, 227.27; 385/12
See application file for complete search history.

(56) References Cited

U.S. PATENT DOCUMENTS

| | | | |
|---|---|---|---|
| 5,202,745 A * | 4/1993 | Sorin et al. | 356/73.1 |
| 5,321,501 A * | 6/1994 | Swanson et al. | 356/479 |
| 5,610,716 A | 3/1997 | Sorin et al. | |
| 6,134,003 A * | 10/2000 | Tearney et al. | 356/479 |
| 6,847,453 B2 | 1/2005 | Bush | |
| 7,023,563 B2 * | 4/2006 | Li | 356/521 |
| 7,079,256 B2 * | 7/2006 | Li | 356/497 |

* cited by examiner

*Primary Examiner*—Michael A. Lyons

(57) ABSTRACT

A system and method of optical reflectometry and optical coherence tomography (OCT) is provided by using a wavefront-division interferometer where a beam is split into side-by-side beam portions. The interference is tuned by changing the phase difference between the beam portions. The interference contrast is adjusted by changing the ratio of the beam portions. The structure of the optical reflectometry and OCT is compact and insensitive to environmental changes. Methods are also provided for multi-level and multi-layer optical data storage systems.

20 Claims, 6 Drawing Sheets

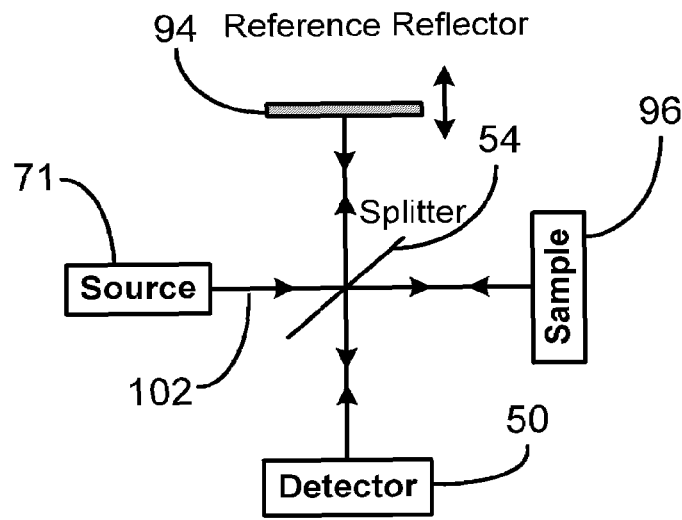
FIG. 1-A (*Prior Art*)
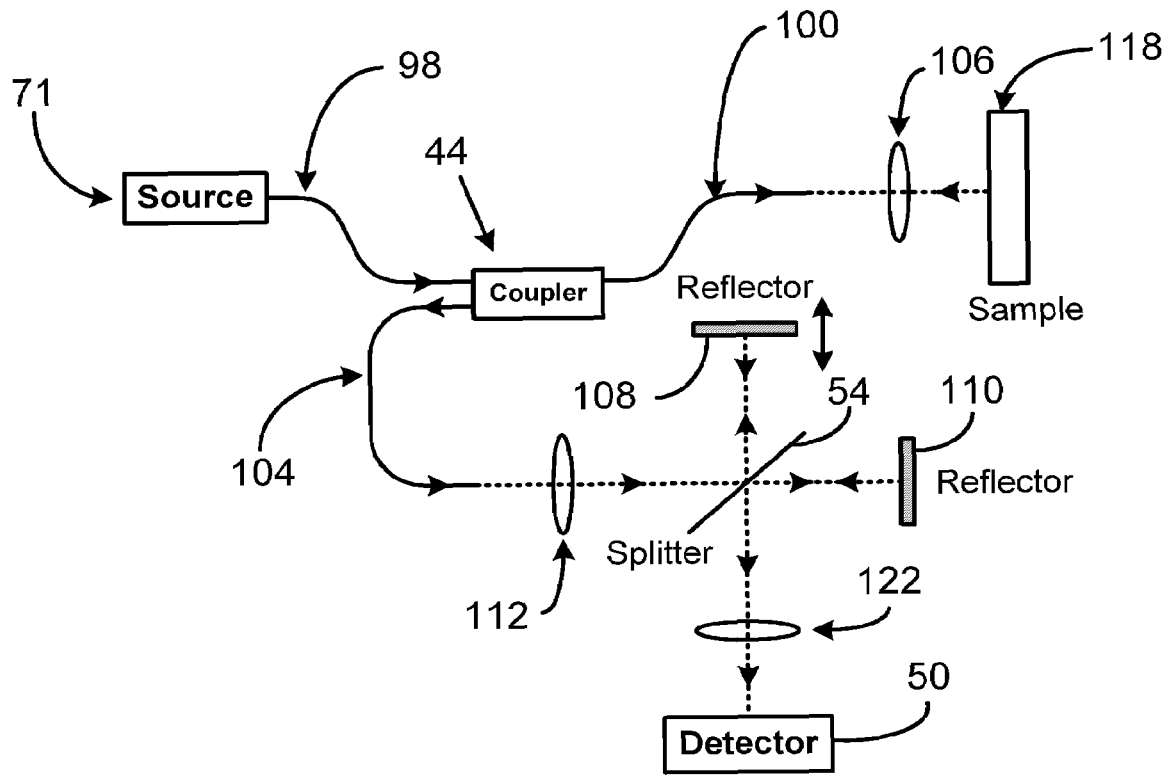
FIG. 1-B (*Prior Art*)

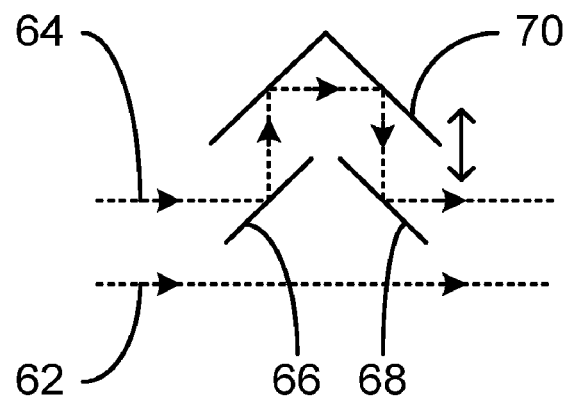
FIG. 6
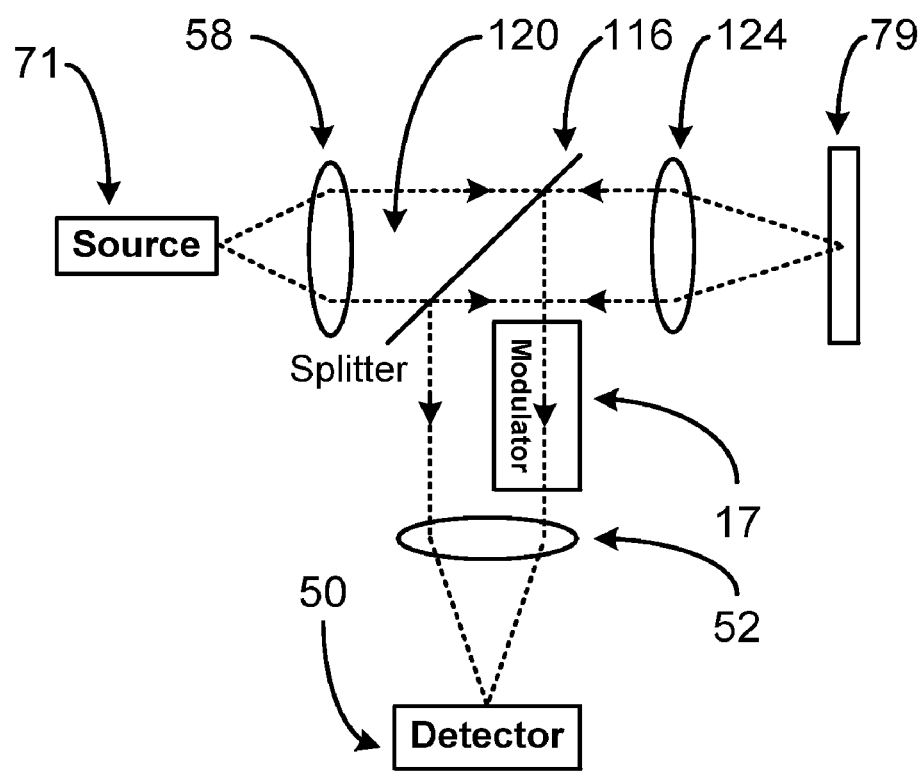
FIG. 7-A

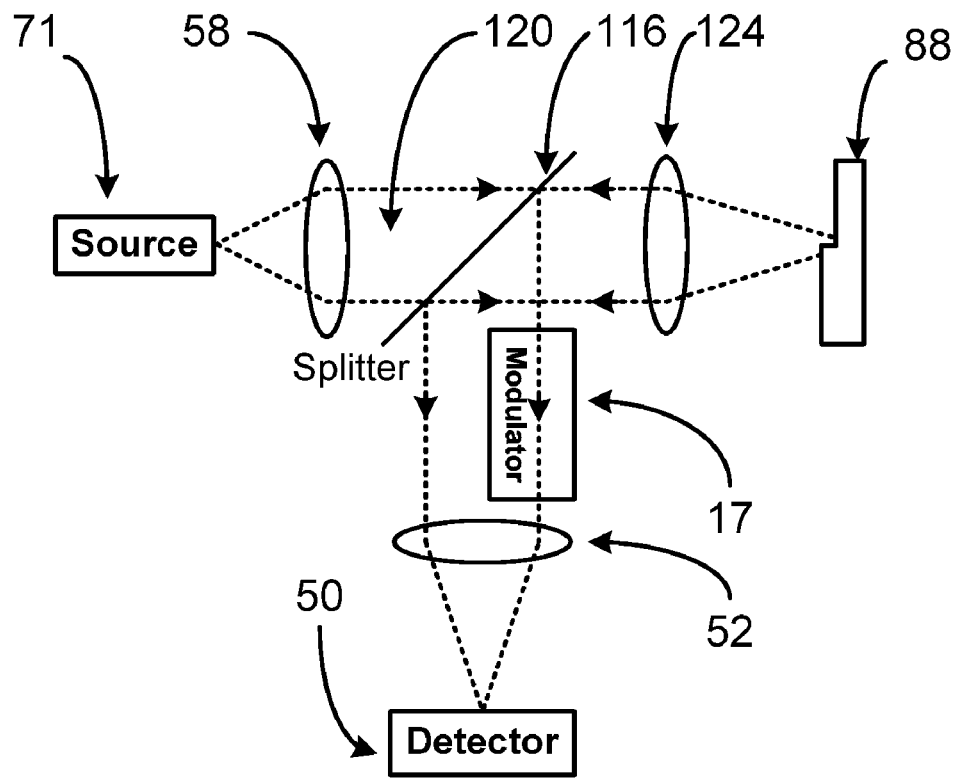
FIG. 7-B
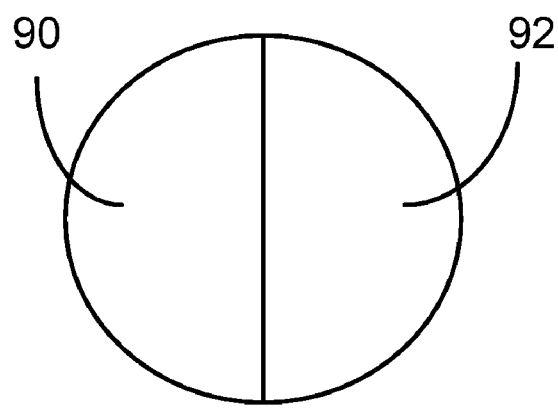
FIG. 7-C

INTERFEROMETRIC OPTICAL APPARATUS AND METHOD USING WAVEFRONT DIVISION

CROSS REFERENCE TO RELATED APPLICATION

This application is entitled to the benefit of Provisional Patent Application Ser. No. 60/605,633, filed Aug. 30, 2004.

BACKGROUND—FIELD OF INVENTION

This invention is related to interferometric optical devices for measurements, particularly to optical reflectometry, optical coherence tomography, and optical data storage systems.

BACKGROUND—DESCRIPTION OF PRIOR ART

Non-contact measurements of film thickness are often required in many manufacturing processes for monitoring and control purposes. Usually such measurements are accomplished by an optical interferometric method, such as optical reflectometry. The interferometer involved is of Michelson type, where a beam reflected by a film is divided into two beams by an amplitude-division beam splitter. The two beams are recombined to create interference after being transmitted through separate optical paths. The reflected beam contains two waves, which are bounced respectively by two surfaces of the film and have different phase retardations. The Michelson interferometer causes the reflected beam to split again. Therefore the interference happens among four waves and is tunable by adjusting the Michelson interferometer.

Assume a low-coherence light source is used. Low-coherence interference occurs only when optical path length difference between two beams is within the beam's coherence length. The interference intensity and pattern contrast reaches maximum when the two path lengths are matched. Thus when the phase difference caused by the film is compensated by the Michelson interferometer, intensity maximum shows up and film thickness can be calculated. However, due to separate paths of the interferometer, the setup is bulky and sensitive to environmental changes, since the paths may experience different ambient temperature changes. In addition, the reflected beam is split by a fixed ratio determined by the splitter. So the interference contrast can't be adjusted, which affects the measurement dynamic range and accuracy.

Accordingly, there is a need for optical reflectometry which is compact, less sensitive to environmental changes, and has an adjustable interference contrast.

In recent years, optical coherence tomography (OCT) has been generated great interest among the academic community and industry. Being able to obtain a three dimensional image of a highly scattering medium with resolution much better than the ultrasound imaging, OCT has great potentials in biomedical applications.

An OCT system employs low-coherence interference for measurements. At the heart of a traditional OCT is an amplitude-division interferometer, usually a Michelson interferometer. An OCT system splits a beam into two beams by a beam splitter. One beam propagates to a reference reflector along a reference optical path, while the other beam to a sample medium along a sample optical path. The beams reflected by the reference reflector and the sample medium are then recombined by the beam splitter.

For a highly scattering sample medium, various sample paths yield different optical path lengths, depending upon where a beam is reflected inside the medium. Since the reference optical path length can be adjusted to match any sample optical path length, tuning the reference path length results in low-coherence interference between the reference beam and a sample beam which is reflected from a layer at a depth inside the medium. The interference intensity and patterns are related to the layer's optical properties, such as refractive index, birefringence, scattering coefficient, etc. Coherence length of the beam determines the measurement resolution along the beam propagation direction. The shorter the coherence length is, the higher the measurement resolution. By combing the low-coherence interference technique with a laterally scanning mechanism, a three-dimensional image can be constructed.

Accordingly like the optical reflectometry, the current OCT suffers a bulky structure, is sensitive to environmental changes, and has a fixed interference contrast due to the amplitude division interferometer.

Most optical discs, including a compact disc (CD) and a digital versatile disc (DVD), have a single storage level and a single storage layer for storing information. A single storage level means data is stored using "0" and "1" only. There is no value in between. To increase storage capacity, multi-level and multi-layer discs are desired.

In a multi-level storage medium, the depth of a pit or index of refraction has multiple values to represent levels between "0" and "1". Intensity of a readout beam depends upon the values, and is used for the readout. This method relies on the absolute intensity measurement, which is also affected by other factors, such as a scratch or dirt on a disc. As a consequence, the method has difficulties in practice.

For the multi-layer optical storage, a double layer disc is the simplest and most implemented version. To read two layers, an objective lens is moved between two positions, which in turn moves the focal position of a read-out beam such that the beam is focused onto each layer respectively. Similar read-out methods are also used for more than two storage layers. Obviously, the maximum allowable number of storage layers in a multi-layer disc is determined by the spacing between two adjacent storage layers and the working distance of the objective lens. But the spacing has to be large enough to avoid crosstalk between the neighboring layers. Depending upon each individual system, the spacing ranges from 30 to 80 micrometers.

In order to place storage layers more closely in an optical disc, other methods have been proposed to read a layer without severe crosstalk from its neighbors. Naturally, one of them employs techniques of OCT, since multiple storage layers in a disc, which are partially reflective, partially transmissive, and distributed in three dimensions, resemble a scattering medium. It is known that an optical path length is of the product of a path length by the refractive index along the path, thus the minimum distance between adjacent layers is of half the beam's coherence length divided by the refractive index. For a low-coherence light source, its coherence length can be in the order of 1 micrometer. Therefore an optical disc using OCT techniques may have a much smaller layer spacing and hold much more storage layers than a conventional optical disc.

There are several references using OCT methods for a multi-layer optical disc. See, for example, U.S. Pat. No. 5,883,875 (1999) to Coufal, et al. and U.S. Pat. No. 6,072,765 (2000) to Rolland, et al. As a result, the multi-layer disc contains only storage layers, while the reference reflector is built within the OCT system. Since read-out results depend upon an optical path length to a storage layer, disc vibration causes changes of the optical path length and brings measurement errors. Thus besides the drawbacks of a current OCT due to separate sample and reference paths, the setup is also sensitive to sample vibration.

Accordingly, there is a need for an optical disc system which is able to read out multi-level and multi-layer optical discs.

OBJECTS AND ADVANTAGES

Accordingly, several main objects and advantages of the present invention are:

a). to provide an improved optical reflectometry system;

b). to provide such a system which has a compact structure;

c). to provide such a system which is able to adjust interference contrast;

d). to provide such a system which is insensitive to environmental changes;

e). to provide an improved OCT device;

f). to provide such a device which has a compact structure;

g). to provide such a device which is able to adjust interference contrast;

h). to provide such a device which is insensitive to environmental changes.

i). to provide an improved optical data storage system;

j). to provide such a storage system which is able to read out a multi-level optical disc; and k). to provide such a storage system which is able to read out a multi-layer optical disc.

Further objects and advantages will become apparent from a consideration of the drawings and ensuing description.

SUMMARY

In accordance with the present invention, wavefront division is employed to split a beam into side-by-side beam portions, where one beam portion is phase delayed relative to the other. The beam portions are then combined, reflected by a sample, and transmitted to a detector which detects an interferometric signal. In another embodiment, a beam is split into beam portions by wavefront division after being reflected by a sample. In the embodiments, the interference intensity is adjusted by changing the phase difference between the beam portions. The interferometer structure results in optical reflectometry and OCT which are compact, insensitive to environmental changes, and have adjustable interference contrast. Optical data storage systems using the interferometer structure are able to read out multi-level and multi-layer optical discs.

ABBREVIATIONS

| AR | Anti-reflection |
| HR | High Reflection |
| OCT | Optical Coherence Tomography |
| PR | Partial Reflection |

DRAWING FIGURES

FIGS. 1-A and 1-B are schematic diagrams showing prior-art reflectometry and OCT configurations.

FIG. 6 is a schematic diagram illustrating a method to change an optical path length mechanically according to the invention.

FIGS. 7-A to 7-C are schematic diagrams illustrating embodiments of optical reflectometry and storage systems according to the invention.

Figure 8:
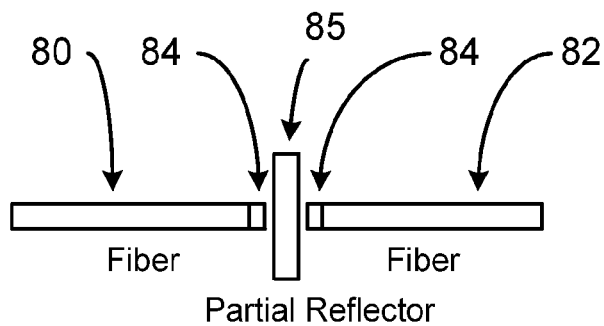
Figure 9:
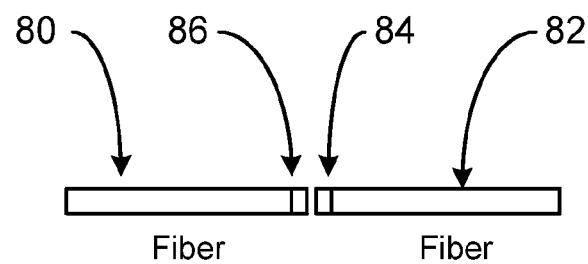
Figure 10:
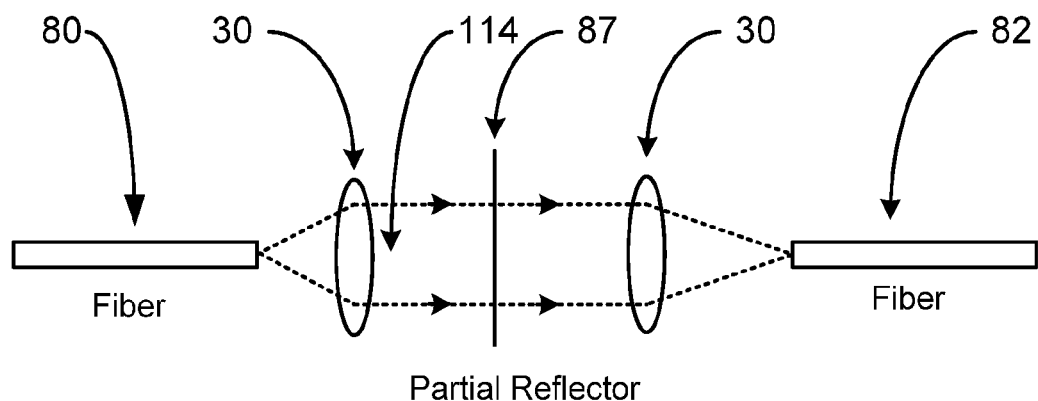

FIGS. 8 to 10 are schematic diagrams illustrating embodiments of disposing a reference reflector.

REFERENCE NUMERALS IN DRAWINGS

| 12 | collimated beam | 17 | spatial phase modulator |
| 18 | beam portion | 20 | beam portion |
| 21 | sample film | 22 | sample |
| 26 | reference reflector | 30 | lens system |
| 40 | lens system | 42 | single-mode fiber |
| 44 | fiberoptic coupler | 46 | single-mode fiber |
| 48 | single-mode fiber | 50 | detector |
| 52 | lens system | 54 | beam splitter |
| 58 | lens system | 62 | beam portion |
| 64 | beam portion | 66 | HR reflector |
| 68 | HR reflector | 70 | retro-reflector |
| 71 | light source | 79 | sample |
| 80 | single-mode fiber | 82 | single-mode fiber |
| 84 | AR coating | 85 | PR reflector |
| 86 | PR coating | 87 | PR reflector |
| 88 | sample | 90 | beam portion |
| 92 | beam portion | 94 | reference reflector |
| 96 | sample | 98 | single-mode fiber |
| 100 | single-mode fiber | 102 | beam |
| 104 | single-mode fiber | 106 | lens system |
| 108 | movable reflector | 110 | reflector |
| 112 | lens system | 114 | collimated beam |
| 116 | beam splitter | 118 | sample film |
| 120 | collimated beam | 122 | lens system |
| 124 | lens system | | |

DETAILED DESCRIPTION

FIGS. 1-A and 1-B—Prior—Optical Devices

FIG. 1-A depicts schematically a prior-art Michelson interferometer. The setup is widely used in optical reflectometry and OCT. A light source 71 emits a beam 102 which is split into reference and sample beams by a beam splitter 54. The reference and sample beams are transmitted to a reference reflector 94 and a sample 96 and reflected back respectively. The reflected beams are combined by splitter 54 and a detector 50 detects an interference signal caused by the beams. If the sample is a film, the reflected sample beam contains two waves. For a highly scattering medium, the sample beam contains many waves. To measure the film thickness or the scattering medium, the interference between the reference and sample beams is tuned by moving reference reflector 94. As discussed before, due to separate reference and sample paths, the setup causes issues such as a bulky structure, sensitivity to environmental changes, and fixed interference contrast.

FIG. 1-B shows schematically a prior-art optical reflectometry system. A beam from light source 71 is coupled into a single-mode fiber 98, then a fiber 100 after passing through a 1×2 fiberoptic coupler 44. The beam is focused onto a sample film 118 by a lens system 106 and the reflected beam is collected by fiber 100. The reflected beam then passes through coupler 44 and part of it is coupled into a single-mode fiber 104. Next a lens system 112 collimates the beam from fiber 104. The collimated beam then enters a Michelson interferometer, which has a movable reflector 108, a fixed reflector 110, and splitter 54. Because of film 118's two reflective surfaces and splitter 54, detector 50 receives four waves through a lens system 122. Assume that source 71 has low coherence. Thickness of film 118 can be obtained by adjusting reflector 108 to match two optical path lengths among the four waves. Again, since splitter 54 works by amplitude division, it causes separate optical paths and the issues as discussed above.

Figure 2:
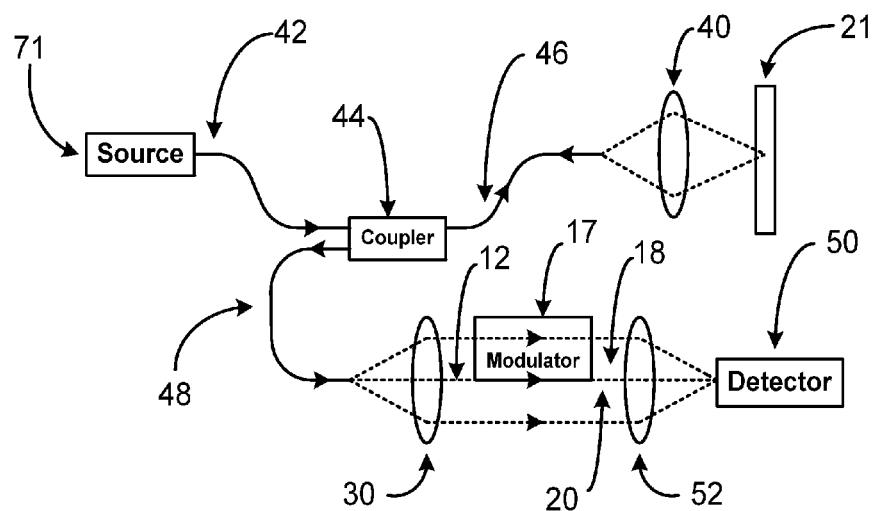
FIGS. 2 to 3 are schematic diagrams illustrating embodiments of optical reflectometry and storage systems according to the invention.
Figure 3:
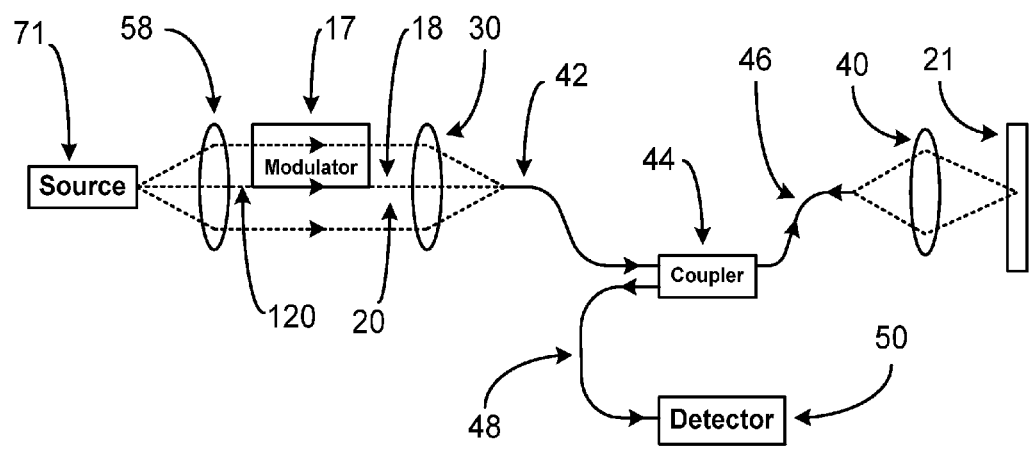

FIGS. 2 and 3—Optical Reflectometry and Stoarge System

FIG. 2 shows schematically an embodiment of optical reflectometry according to the invention. A beam is coupled into a single-mode fiber 42 from light source 71. After passing through coupler 44, the beam propagates along a single-mode fiber 46, and then is focused by a lens system 40 onto a sample film 21. Film 21 has a front surface and a rear surface. The beam is reflected by the two surfaces respectively. The reflected beam is coupled back into fiber 46. Coupler 44 then couples the reflected beam into a single-mode fiber 48, and lens system 30 converts the beam into a collimated beam 12. A spatial phase modulator 17 then divides beam 12 into beam portions 18 and 20 by wavefront division, and produces phase difference between them. Modulator 17 contains low loss and transparent materials. The index of refraction and path length, along which beam 18 travels inside modulator 17, determine phase or optical path length difference between beam portions 18 and 20. Next, portions 18 and 20 are focused onto a detector 50. Detector 50 measures interference between the beam portions.

Prior to entering modulator 17, beam 12 has two waves with a phase difference as a result of the reflection by film 21. Then beam 12 is divided into two beam portions, which experience different phase retardations. So detector 50 receives four waves totally. If the phase difference caused by film 21 and modulator 17 are matched, two of the four waves will have the matching phase retardation, while the other two waves have the smallest and the largest retardation. Thus, if the optical path length difference caused by film 21 is larger than the coherence length of the source, we may tune the modulator to generate and adjust interference exclusively between two waves. Therefore thickness or index information of film 21 can be obtained by tuning modulator 17.

Compared with the prior art of FIG. 1-B, the structure here is compact because beam portions 18 and 20 are side-by-side. Also because of the side-by-side feature, the beam portions experience similar ambient variation. So the system is insensitive to environmental changes. Furthermore, intensity ratio of portion 18 to 20 can be adjusted by moving modulator 17 in or out of beam 12 in a direction perpendicular to the beam. The adjustment changes intensity ratio between the two interfering waves, which improves interference contrast and signal-to-noise ratio without sacrificing the total beam power.

Embodiment of FIG. 2 can also be used to detect a sample having more than two reflective interfaces, which generate more than two reflected waves each having a respective phase retardation. To measure a distance between any two interfaces, the method remains the same, that is, modulator 17 is utilized to create exclusive interference by compensating optical path length difference caused by the interfaces. When the reflectors inside the sample are in pairs, reflection from each pair can be selected and measured. For that purpose, the interval between each pairs should be larger than half the coherence length divided by the refractive index, and each pair has a specific spacing. The spacing values are chosen such that when optical path lengths are matched between two paths from source 71 to detector 50 via the reflector pair, the minimum optical path length difference among the rest waves is larger than the coherence length. Thus, the interference occurs only between two waves. The method may be used to obtain optical information of the pairs and the sample.

The scheme to measure multiple reflector pairs can be used for a multi-layer optical data storage system, where a storage medium contains multiple layers which form multiple storage cells. Each storage cell has a pair of storage and reference layers. Distance between the storage and reference layers in each cell is known. The storage layer stores data by reflectivity value. Since medium movement causes the same optical path change to the reflected waves, the system is insensitive to medium vibration.

FIG. 3 shows schematically another embodiment of optical reflectometry. The embodiment works in the same principles as that of FIG. 2. A lens system 58 converts a beam from light source 71 into a collimated beam 120. Modulator 17 divides beam 120 into beam portions 18 and 20 and phase delays portion 18. Beam portions 18 and 20 are combined and coupled into fiber 42 by lens system 30. The combined beam is then transmitted through coupler 44, reflected by film 21, and finally received by detector 50 after propagating through fiber 46 and 48. The structural difference between the embodiments of FIGS. 2 and 3 is that here the beam is divided into two waves with a phase difference prior to reaching film 21. Film 21 then reflects the waves twice. Thus again, detector 50 receives four waves with respective phase retardations. As already described with reference to FIG. 2, two of the waves can be matched in optical path length by tuning modulator 17. Therefore embodiments of FIGS. 2 and 3 have same results.

Figure 4:
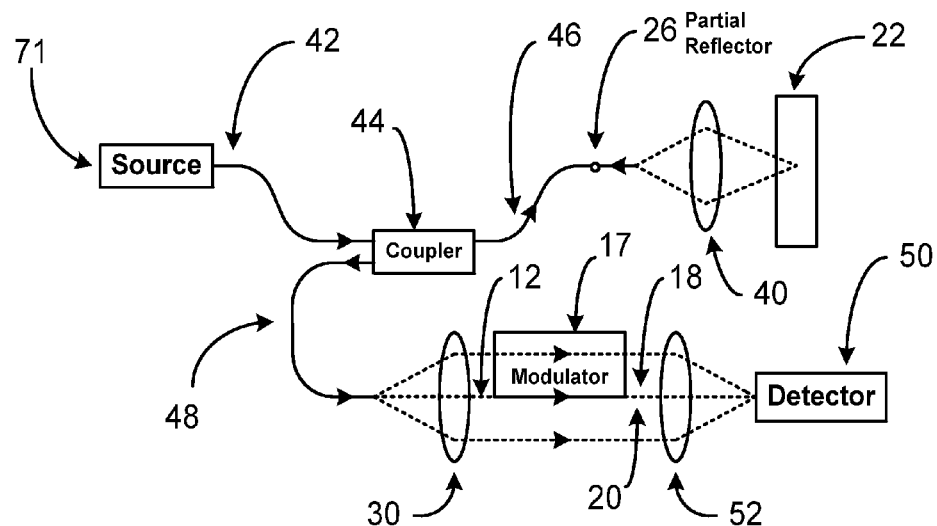
FIGS. 4 to 5 are schematic diagrams illustrating embodiments of optical reflectometry and OCT according to the invention.
Figure 5:
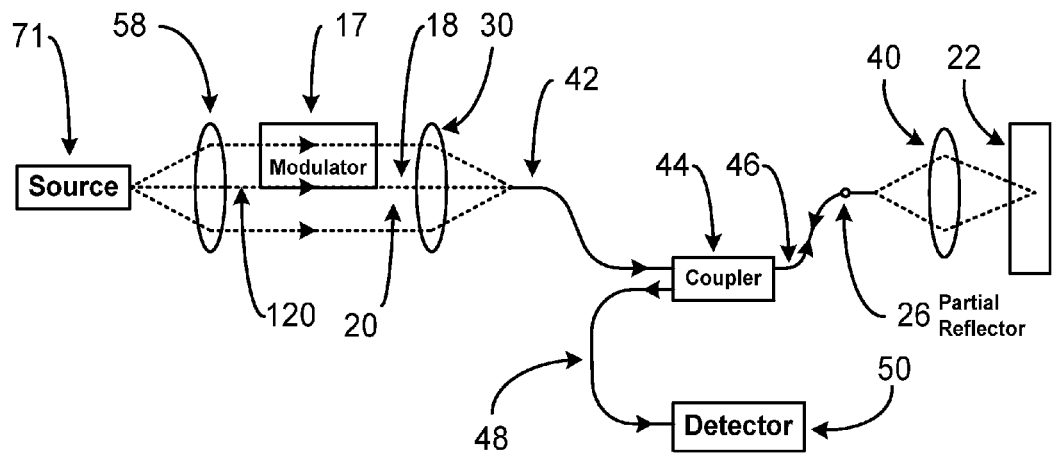

FIGS. 4 and 5—Optical Reflectometry and Oct

FIG. 4 shows schematically an embodiment for measuring a sample 22 according to the invention. The embodiment of FIG. 4 is similar to that of FIG. 2, except that a partial reflection (PR) reflector 26 is added between coupler 44 and lens system 40. If sample 22 is a film with two reflective surfaces, detector 50 will receive six waves. By tuning modulator 17, distance between reflector 26 and the first surface and thickness of the film can be obtained.

Besides reflectometry, the setup of FIG. 4 also serves as an OCT system, where 26 becomes a reference reflector. Assume sample 22 is highly scattering. Reflector 26 defines a reference optical path, while sample paths are determined by reflections from different levels in the sample. Optical path lengths are matched between the reference path and each sample path by tuning modulator 17.

FIG. 5 illustrates schematically another embodiment of the invention which divides and processes two beam portions before the beam reaches a sample. The difference between FIGS. 4 and 5 is the same as that between FIGS. 2 and 3. As FIG. 4, embodiment of FIG. 5 can be used in optical reflectometry and OCT.

FIG. 6—Tunable Spatial Phase Modulator

There are electro-optical or mechanical ways to make a tunable spatial phase modulator. The key is to create tunable optical path length difference between two beam portions by either refractive index or path length or both. For example, modulator 17 of FIG. 2 may be rotated to change path length inside it. If modulator 17 is made up of electro-optical material, its refractive index may be used for adjusting the optical path length.

A mechanically tuned spatial phase modulator is depicted schematically in FIG. 6. Beam portion 62 and 64 are split and then recombined. A retro-reflector 70 and high reflection (HR) reflectors 66 and 68 are disposed to modulate the phase difference between the beam portions. Reflector 66 is aligned to reflect portion 64, which is then reflected by reflector 70 and 68. The phase difference is tuned by moving reflector 70.

FIGS. 7-A-7-C—Optical Reflectometry and Stoarge System

FIG. 7-A illustrates schematically another embodiment of the invention which features a free space configuration. In principle, embodiment of FIG. 7-A is similar to that of FIG. 2. The differences between them are that a beam splitter 116 replaces coupler 44, and the beam propagates in free space instead of through single-mode fibers. The two embodiments share similar results.

In FIG. 7-A, collimated beam 120 passes through splitter 116 and is focused onto a sample 79 by a lens system 124. The reflected beam is collimated by lens system 124, reflected by splitter 116, and processed by modulator 17 before reaching detector 50. If sample 79 is a film with front and rear reflective surfaces, detector 50 receives four waves. The measurement method is the same as discussed for the embodiment of FIG. 2. So are the schemes for more than two reflective interfaces and multi-layer optical storage systems.

If sample 79 is highly scattering, a reference PR reflector may be disposed between beam splitter 116 and the sample, which works in the same way as reflector 26 of FIG. 4. One scheme includes a PR reflector being disposed perpendicular to beam 120 and between beam splitter 116 and lens 124.

The free space scheme is more preferable than a fiber version for applications in optical data storage because of its compactness. It may be used to read out a multi-layer storage medium as discussed before. The scheme may also be used to read out a multi-level storage medium as is illustrated schematically in FIG. 7-B.

A sample 88 has a reflective surface with a step. The step makes the reflected beam have two waves and the phase difference between the waves is dependent upon the step height. For a conventional optical disc, the step has a fixed height. For a multi-level optical disc, the step height has multiple values to increase storage capacity. If the two waves overlap after reflection, readout method is the same as in the case of a multi-layer disc. Current multi-level read-out method relies on interference intensity between the two waves, which may be affected by other factors besides the step height. The scheme of FIG. 7-B measures phase difference between the waves. Thus it has more accurate results.

If the two waves remain separated in space after reflection, as shown schematically by portions 90 and 92 in FIG. 7-C, a modulator may be used to process the waves respectively. For example, modulator 17 of FIG. 7-B may be disposed to phase delay one wave only. As a result, detector 50 receives two waves instead of four waves and the beam power is utilized more efficiently than in the four-wave case. Modulator 17 works by matching optical path lengths of the two waves. Furthermore, since only two waves are involved, highly coherent light source can be used without worrying multiple wave interference, especially when the step height causes a phase difference smaller than pi, half of the period.

FIGS. 8-10—Disposing Reference Refletcor

For embodiments of FIGS. 4 and 5, reflector 26 may be a PR coating on the end surface of fiber 46, or a reflector disposed between fiber 46 and sample 22. If reflector 26 is built between two fiber segments, FIGS. 8 to 10 show schematically three embodiments.

In FIG. 8, single-mode fibers 80 and 82 have anti-reflection (AR) coatings 84 on their ends. A filter 85 has PR and AR coatings on front and rear surfaces separately. The PR coating functions as reflector 26 of FIG. 4. Filter 85 should be thin enough for a small separation between the fibers in order to avoid excessive optical power loss. Fibers 80 and 82 are aligned and bonded together with filter 85 (bonding and supporting materials are not shown in FIG. 8).

In FIG. 9, fibers 80 and 82 have a PR coating 86 and AR coating 84, respectively. The fibers are aligned and bond together; and they should be close enough to avoid excessive optical power loss.

In FIG. 10, lens system 30 is introduced to collimate a beam from fiber 80 and couple a collimated beam 114 into fiber 82. A PR filter 87 is placed perpendicular to beam 114. Filter 87 has two surfaces coated with PR and AR coatings. Fibers 80 and 82 should have their ends angled and AR coated to reduce reflection.

CONCLUSION, RAMIFICATIONS, AND SCOPE

Thus it can be seen that I have used wavefront division to provide optical reflectometry, OCT, and optical data storage systems.

The reflectometry and OCT systems have the following advantages:

A compact size, insensitivity to environmental changes, and the ability to adjust the interference contrast.

The optical data storage system has the following advantages:

The ability to read out a multi-layer optical disc and the readout result is insensitive to medium vibration.

The ability to read out a multi-level optical disc and the readout result is more accurate than the current method.

Although the description above contains many specificities, these should not be construed as limiting the scope of the invention but as merely providing illustrations of some of the presently preferred embodiments. Numerous modifications, alternations, and variations will be obvious to those skilled in the art. For example, a beam can be divided into two beam portions with any ratio depending on the interference contrast detected by the detector. The beam portions may be parts of a divergent or convergent beam besides a collimated beam, since an optical path length can be adjusted regardless of the beam's property. In FIG. 7-B, sample 88 can have a pit or bump instead of a step. Finally, multi-level of a medium can be represented by multiple values of the refractive index besides multiple step heights.

Therefore the scope of the invention should be determined by the appended claims and their legal equivalents, rather than by the examples given.

What is claimed is:

1. A method for generating optical interference, comprising:
   1) providing a light source for generating a first beam;
   2) disposing a spatial phase modulator for dividing said first beam into a plurality of beam portions by wavefront division and phase shifting at least one of said beam portions;
   3) combining said beam portions for generating a second beam;
   4) splitting said second beam into a plurality of waves and transmitting said waves through a plurality of optical paths respectively; and
   5) sensing interference caused by said waves by a detector.

2. The method according to claim 1 wherein said optical paths include at least one sample path, said at least one sample path being connected to a sample under test.

3. The method according to claim 2, further including scanning said sample for obtaining an image of said sample.

4. The method according to claim 1 wherein said light source has relatively low coherence.

5. The method according to claim 1, further including adjusting said phase shift.

6. The method according to claim 1, further including transmitting said first and second beams through a plurality of single-mode optical fibers.

7. A method for generating optical interference, comprising:
   1) providing a light source for generating a first beam;
   2) splitting said first beam into a plurality of waves and transmitting said waves through a plurality of optical paths respectively;
   3) combining said waves for generating a second beam;
   4) dividing said second beam into a plurality of beam portions by wavefront division and phase shifting at least one of said beam portions; and
   5) sensing interference by said beam portions by a detector.

8. The method according to claim 7 wherein said optical paths include at least one sample path, said at least one sample path being connected to a sample under test.

9. The method according to claim 8, further including scanning said sample for obtaining an image of said sample.

10. The method according to claim 7, further including focusing said beam portions onto said detector.

11. The method according to claim 7 wherein said light source has relatively low coherence.

12. The method according to claim 7, further including adjusting said phase shift.

13. The method according to claim 7, further including transmitting said first and second beams through a plurality of single-mode optical fibers.

14. A method for generating optical interference, comprising:
   1) providing a light source for generating a beam, said beam comprising a plurality of beam portions by wavefront division;
   2) transmitting said beam portions through a plurality of optical paths, said optical paths being arranged to phase delay said beam portions respectively;
   3) phase shifting at least one of said phase delayed beam portions; and
   4) sensing interference by said phase delayed and phase shifted beam portions.

15. The method according to claim 14 wherein said light source has relatively low coherence.

16. The method according to claim 14, further including adjusting said phase shift.

17. The method according to claim 14 wherein said optical paths include at least one sample path, said at least one sample path being connected to a sample under test.

18. An interferometric optical device comprising:
   1) a light source for generating a first beam;
   2) at least one medium for splitting said first beam into a plurality of waves and transmitting said waves through a plurality of optical paths;
   3) combining optics for combining said waves for generating a second beam;
   4) a spatial phase modulator for dividing said second beam into a plurality of beam portions by wavefront division and phase shifting at least one of said beam portions; and
   5) a detector for sensing interference by said beam portions.

19. The device according to claim 18 wherein said at least one medium includes a sample under test.

20. The device according to claim 18, further including a tuning mechanism for adjusting said phase shift.

* * * * *